United States Patent [19]

Lutes, Jr.

[11] 4,234,971
[45] Nov. 18, 1980

[54] PRECISE RF TIMING SIGNAL DISTRIBUTION TO REMOTE STATIONS

[76] Inventor: Robert A. Frosch, Administrator of the National Aeronautics and Space Administration, with respect to an invention of Georg F. Lutes, Jr., Glendale, Calif.

[21] Appl. No.: 78,521

[22] Filed: Sep. 24, 1979

[51] Int. Cl.³ .............................................. H04B 9/00
[52] U.S. Cl. ................................... 455/619; 375/107; 455/51; 455/71
[58] Field of Search ................. 455/619, 617, 612, 51, 455/71, 69; 370/1, 3; 375/107

[56] References Cited

U.S. PATENT DOCUMENTS

| 3,573,463 | 4/1971 | Goodwin | 455/607 |
|---|---|---|---|
| 3,727,062 | 4/1973 | Foster | 370/3 |
| 3,801,819 | 4/1974 | Ohnsorge | 455/601 |
| 3,883,874 | 5/1975 | Swanson | 455/51 |
| 3,943,358 | 3/1976 | Reymond | 455/612 |
| 3,979,686 | 9/1976 | Abrams | 455/619 |

Primary Examiner—Howard W. Britton
Attorney, Agent, or Firm—Monte F. Mott; John R. Manning; Paul F. McCaul

[57] ABSTRACT

This invention relates to a method and apparatus for distributing a stable reference frequency from a hydrogen maser frequency standard, or similar RF source, to remote stations over great distances with very good phase stability, and with constant amplitude, at each distribution point, using a light beam carrier, and more particularly to a technique for providing automatic gain control at an optical receiver with phase stability in the RF reference.

6 Claims, 2 Drawing Figures

PRECISE RF TIMING SIGNAL DISTRIBUTION TO REMOTE STATIONS

ORIGIN OF THE INVENTION

The invention described herein was made in the performance of work under a NASA contract and is subject to the provisions of Section 305 of the National Aeronautics and Space Act of 1978, Public Law 85-568 (72 Stat. 435; 42 USC 2457).

BACKGROUND OF THE INVENTION

In many applications, it is necessary to transmit a reference frequency to a number of stations over kilometer distances. The signals must have substantially the same phase stability and amplitude at all distribution points for use by signal processing equipment.

One precise frequency signal source is a hydrogen maser, but the maser output varies in amplitude. While an automatic gain control (AGC) circuit may be used at each station to maintain constant amplitude at each distribution point, an electrical AGC attenuator introduces phase shifts in the RF timing signal as a function of attenuation. The result would then be reference signals at the distribution points varying widely in phase so that phase stability of the various stations would be lost.

To avoid this phase shift in the attenuator, compensation circuits utilizing phase locked loops have been employed. Such resolution to the problem is unsatisfactory. The phase lock loops are complex and are subject to the usual component failure rates for electronic equipment. What is required is an improved and simplified distribution system with AGC at each distribution point and without any significant phase shift due to the reduction of amplitude changes.

SUMMARY OF THE INVENTION

The present invention provides an improved and simplified distribution system for a precise RF reference signal, such as an H-maser signal, using a light beam as a frequency carrier, modulating the light beam with the RF timing signal, and after distribution to remote stations through optical fibers, demodulating the carrier with an optical detector to detect the RF timing signal. The detected RF reference signal is then processed through an RF detector to provide an AGC signal that has an average value proportional to the amplitude of the RF reference signal. This AGC signal is applied to a light attenuator positioned in front of the RF detector functioning as an optical receiver. The phase shift of the light attenuator may thus vary many cycles at light frequency. However, since the light frequency is very high, as compared to the RF reference signal, deviation of the reference signal phase is a very small fraction of the RF frequency. In that manner, the timing signal amplitude is maintained constant at each station with substantially zero phase stability degradation.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
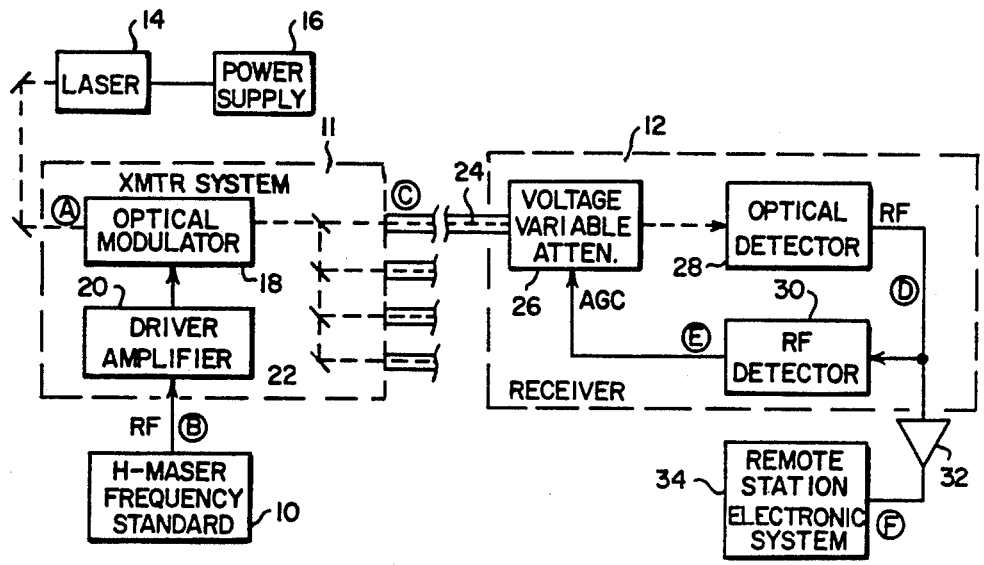
FIG. 1 is a block diagram of a system embodying the invention.

Referring now to FIG. 1 of the drawings, a system is shown for producing a modulated beam of light for distribution to a plurality of remote stations at great distances. The modulation information consists of an RF timing signal generated by a hydrogen maser 10. The RF timing signal is to be transmitted to the remote stations for utilization in various electronic systems. Although a transmitter system 11 is shown with only one remote station receiver 12, it will be appreciated that a plurality of station receivers may be similarly provided, each at a remote point located from the transmitter system a distance that is limited by only the length that an optical fiber can be used for transmission of light. For the current state of the art, that distance is about 50 kilometers.

The beam of light is generated by a laser 14 energized by a power supply 16. The laser beam, which has an extremely small cross sectional area, is directed through a modulator 18.

The modulator 18 may be implemented in a number of different ways. One exemplary way is with a Kerr cell operating as an electro-optical shutter for controlling or cutting off the beam of light by the application of a strong electric field. Another way is with a Faraday cell which rotates the polarization angle in response to the modulation signal. By first polarizing the input beam with a filter, and then rotating it through an angle (90 or less) in response to the RF signal, the light passed by a similarly oriented filter at the output of the cell is modulated as shown by waveforms A, B and C in FIG. 2.

The combined laser and transmitter could be implemented with a commercially available unit such as a FIBERLINK XA-1000 analog transmitter which has a diode laser that is modulated by an RF signal voltage applied directly to the diode. The laser has an output level of about 16 mw/square cm for an infrared 890 nm unit, and 0.6 mw/square cm for a visible red 660 nm unit. The visible range can be used with plastic optical fibers. The RF timing signal to such a combined laser and transmitter may be between 0 and 0.9 volt peak-to-peak, centered between 0 and 1 volt.

When the modulator is implemented with a Kerr cell, or a Faraday cell, greater signal amplitudes are required for the RF timing signal. A driver amplifier 20 is provided in the transmitter system 11 to produce the required modulating signal amplitude.

The output of the modulator 18 is a pulsed beam directed to a bank of beam splitters 22 preferably implemented with dichroic mirrors and associated lenses directing the laser beam from the modulator into optical fibers, such as an optical fiber 24 coupling the transmitter system 11 to the receiver 12. Each of the other optical fibers couples the transmitter system to a receiver at a different location. Only four optical fibers are shown, but more could be provided. The total number is limited only by the number of times the beam can be split and still have sufficient power for the last optical fiber and receiver.

Each optical fiber is terminated at the receiver 12 by a voltage variable attenuator 26 in an AGC loop. The output of the attenuator is closely coupled to an optical detector 28 which, in this exemplary arrangement, yields the RF timing signal typically as shown by waveform D. An RF detector 30 then yields a DC signal proportional in amplitude to the average amplitude of the optically detected waveform. This DC signal is amplified in the detector 30 and applied to the attenuator 26 for automatic gain control.

The attenuator is preferably implemented with a cell that exhibits the Faraday effect so that attenuation may be achieved as a linear function of the AGC signal amplitude. Such a cell in current use is known as a Bragg cell. It rotates the polarization of the input beam as a function of AGC amplitude. The cell is provided with a polarized filter at the output.

Figure 2:
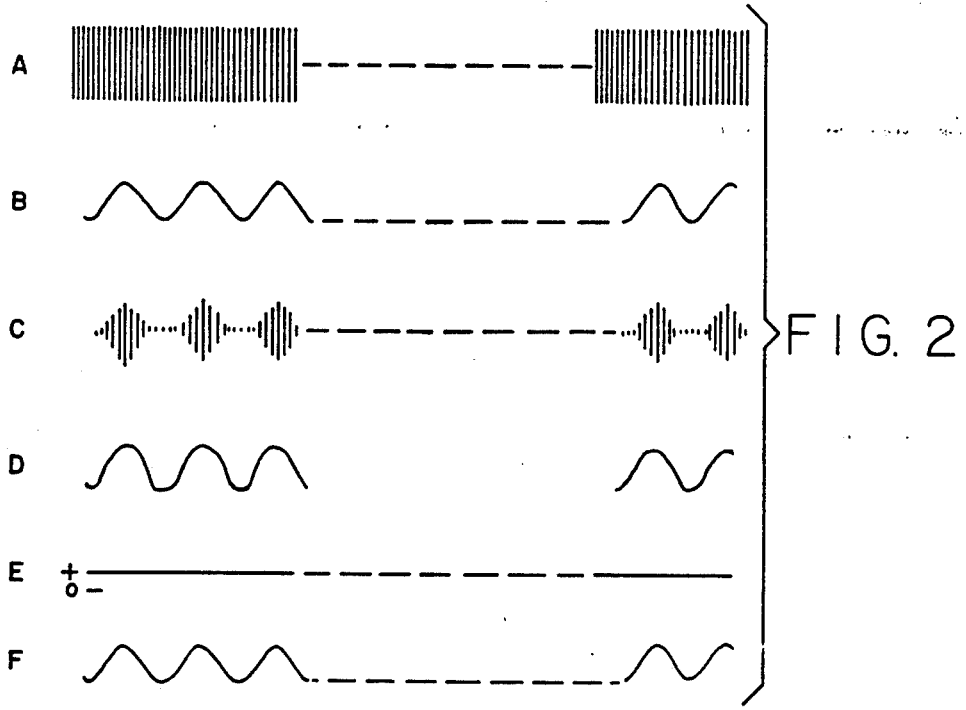
FIG. 2 illustrates typical waveforms at points A through F indicated in the system of FIG. 1.

The optical detector 28 is implemented simply with a photodiode which responds in amplitude to the RF modulation of the light beam to yield the waveform D in FIG. 2. A signal amplifier may be provided between the photodiode and the output of the optical detector. A suitable commercially available fiber optical detector is the FIBERLINK XA-1000 analog receiver.

The RF detector 30 is implemented with a rectifying diode and an R-C lowpass filter. A driver amplifier is provided between the filter and the output of the RF detector in order to provide sufficient power to drive the light beam attenuator.

A power amplifier 32 couples the RF timing signal from the output of the optical detector to an electronic system 34.

There is good phase stability between the RF timing signal at the remote station electronic system and the timing signal applied to the transmitter. This is so because any phase shift resulting from the operation of the voltage variable attenuator 26 is limited to a few cycles of the modulated light beam. That is a very small fraction of one cycle of the RF timing signal. The RF timing signal is used at each station for local oscillator frequency synthesis, and for digital signal processing. Such a reference signal is of extreme importance in, for example, correlating network data received by a plurality of stations which receive the same signal from deep space.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method of distributing a precise RF frequeny signal from a source to a plurality of remotely located stations for use at said stations in processing of data comprising, generating a light beam,
   modulating the amplitude of said light beam with said RF timing signal from said source,
   dividing said modulated beam into a plurality of split beams,
   transmitting each split beam to a different station over an optical fiber, and at each station
   detecting the amplitude modulation of the split beam with an optical detector to produce an RF electrical signal that conforms in frequency with said RF reference signal from said source for use at the station,
   detecting the average amplitude of said RF electrical signal to produce an automatic gain control signal, and
   controlling an optical attenuator at the input of said optical detector for automatic gain control of said RF electrical signal without introducing any appreciable phase shift.

2. The method of claim 1 wherein said beam is a coherent light beam.

3. The method of claim 1 wherein said beam is of the infrared or visible red wavelength.

4. In a system for transmitting an RF signal amplitude modulated on a light beam to a remote station, an optical receiver comprising means for detecting said light beam and producing an RF electrical signal proportional to the amplitude thereof,
   means responsive to said RF electrical signal for producing an automatic gain control signal proportional to the average amplitude of said electrical signal, and
   voltage variable means for attenuating said light received for detection by said detecting means in response to said automatic gain control signal, whereby automatic gain control is achieved for said RF electrical signal with phase stability.

5. In a system as defined in claim 4, a plurality of identical receivers for receiving a portion of the same modulated light beam, whereby a plurality of remote stations are provided an RF reference signal from the same source with phase stability.

6. In a system as defined in claim 5, a plurality of optical fibers, one for each remote station, for conducting a portion of said optical beam to each remote station, means at said central station for splitting said modulated beam into portions, and means for distributing said portions into said optical fibers.

* * * * *